(12) United States Patent
Linnartz et al.

(10) Patent No.: US 6,415,040 B1
(45) Date of Patent: Jul. 2, 2002

(54) DEVICE FOR OPTICALLY SCANNING A RECORD CARRIER

(75) Inventors: Johan P. M. G. Linnartz; Maurice J. J. J-B. Maes; Antonius A. C. M. Kalker; Geert F. G. Depovere; Peter M. J. Rongen; Christianus W. F. Vriens; Marten E. Van Dijk, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/082,446

(22) Filed: May 20, 1998

(30) Foreign Application Priority Data

May 29, 1997 (EP) .............................. 97201600
Jul. 21, 1997 (EP) .............................. 97202276

(51) Int. Cl.[7] ............................. G06K 9/00; H04L 9/00
(52) U.S. Cl. ....................................... 382/100; 713/176
(58) Field of Search ............................... 382/100, 232; 380/54, 210, 252, 287; 713/176

(56) References Cited

U.S. PATENT DOCUMENTS

| | | | | |
|---|---|---|---|---|
| 5,606,609 A | * | 2/1997 | Houser et al. | 382/306 |
| 5,748,783 A | * | 5/1998 | Rhoads | 283/113 |
| 5,933,798 A | * | 8/1999 | Linnartz | 380/202 |
| 6,128,401 A | * | 10/2000 | Suzuki et al. | 382/135 |
| 6,131,161 A | * | 10/2000 | Linnartz | 380/200 |
| 6,226,387 B1 | * | 5/2001 | Tewfik et al. | 382/100 |

FOREIGN PATENT DOCUMENTS

| | | | | |
|---|---|---|---|---|
| EP | 0766468 A2 | 4/1997 | ............ | H04N/7/08 |
| WO | WO 9636163 | 11/1996 | ............ | H04N/1/32 |
| WO | WO 9713248 | 4/1997 | ............ | G11B/20/00 |

OTHER PUBLICATIONS

T. Kalker et al., "Watermark estimation through detector analysis", 1998 International Conference on Image Processing, Oct. 1998.*

Harold Stone, "Analysis on Image Watermarks with Randomized Coefficients", NEC Research Institute, 1996.*

T. Kalker, "A security risk of publicly available watermark detectors", Benelux Information theory Symposium, May 1998.*

"Analysis of the Sensitivity Attack Against Electronic Watermarks in Images", Jean–Paul M.G. Linnartz and Marten Van Dijk, IHW '98 Proceedings of the International Information . . . , vol., Apr. 1998 (Oregon, U.S.A.).

* cited by examiner

*Primary Examiner*—Joseph Mancuso
*Assistant Examiner*—Martin E Miller
(74) *Attorney, Agent, or Firm*—Michael E. Belk

(57) ABSTRACT

A watermark detector is disclosed to judge whether multimedia content can be copied or not. The watermark detector examines the multimedia content and outputs a signal indicating whether a watermark is present or not. A decision variable indicating to which extent the watermark is present is determined, for example, the amount of correlation between the input signal and a reference copy of the watermark to be detected. The watermark is detected if the decision variable exceeds a predetermined threshold ($y_2$). The detector also generates a random output signal for a predetermined range of decision values between the threshold ($y_2$) and a further threshold ($y_1$).

14 Claims, 5 Drawing Sheets

DEVICE FOR OPTICALLY SCANNING A RECORD CARRIER

FIELD OF THE INVENTION

The invention relates to a method and arrangement for detecting a watermark embedded in an information signal. The invention also relates to a method of removing a watermark from an information signal having an embedded watermark.

BACKGROUND OF THE INVENTION

Watermarks are perceptually invisible messages embedded in information signals such as multimedia material, e.g. audio, still pictures, animations or video. Watermarks can be used to identify the copyright ownership of information. They allow a copyright owner to trace illegal copies of his material by inspecting whether his watermark is present in said copies.

Watermarks are embedded in an information signal by modifying data samples of the signal (e.g. audio samples of an audio signal, pixels of an image, transform coefficients of a transform-coded signal, etc.) such that the original is not perceptibly affected. Various methods of watermarking are known in the art. For example, pixels of an original image are slightly incremented or decremented in accordance with corresponding bits of a binary watermark pattern.

In order to detect whether an information signal has an embedded watermark, the signal is subjected to a statistical analysis. The statistical analysis yields a parameter, hereinafter referred to as "decision variable", which indicates to which extent the watermark is present in the signal. For example, if an image signal is watermarked by incrementing or decrementing its pixels in accordance with a watermark pattern, the decision variable may be the amount of correlation between the signal and an applied reference copy of the watermark. If an image is watermarked by modifying selected pixels, a prediction for said pixels is calculated from temporally or spatially adjacent pixels. The decision variable may then be the number of pixels being sufficiently different from their prediction.

Prior art watermark detectors generate a binary output signal indicating "watermark found" or "no watermark found". This is achieved by comparing the decision variable with a predetermined threshold. If the value of the decision variable exceeds the threshold, the watermark is considered to be present in the signal. In consumer products such as home recorders, the watermark detector will generally be implemented as a tamperproof box, so that an attacker can neither reversely engineer the detection algorithm nor its implementation parameters. It has been found, however, that an attacker can nevertheless remove a watermark by observing the detector's binary output signal under various input signal conditions.

OBJECT AND SUMMARY OF THE INVENTION

It is an object of the invention to provide a method and arrangement for detecting a watermark which is less vulnerable to attacks.

To this end, the method in accordance with the invention is characterized by the step of randomly generating said output signal for decision values below said threshold. Preferably, the random output signal is generated for a range of decision values between said threshold and a further predetermined threshold.

The invention is based on the recognition that the prior art watermark detectors exhibit a sharp transition between the decisions "watermark found" and "no watermark found". This property allows an attacker to iteratively modify an input signal and observe the detector's output until he has found an input signal which causes the detector to operate in the vicinity of its threshold. Having thus found the transition point, it is not difficult to generate an input signal which closely resembles the watermarked signal but is not recognized as being watermarked. By randomizing the transition point of the detector, the attacker acquires less (or at least less reliable) information from each signal modification.

Further advantageous embodiments of the invention are defined in the dependent claims.

DESCRIPTION OF EMBODIMENTS

The invention will now be described with reference to a watermark detector in which the decision variable indicating to which extent the watermark is present in the signal is the amount of correlation between the signal being analyzed and a reference copy of the watermark to be detected. However, the description should not be interpreted as restricting the invention to such an embodiment.

Figure 1:
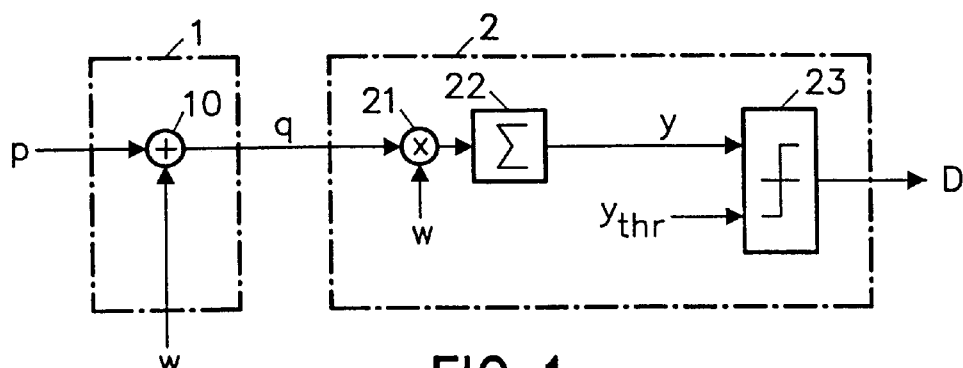
FIG. 1 shows a prior art system comprising a watermark embedder and a watermark detector.
Figure 2:
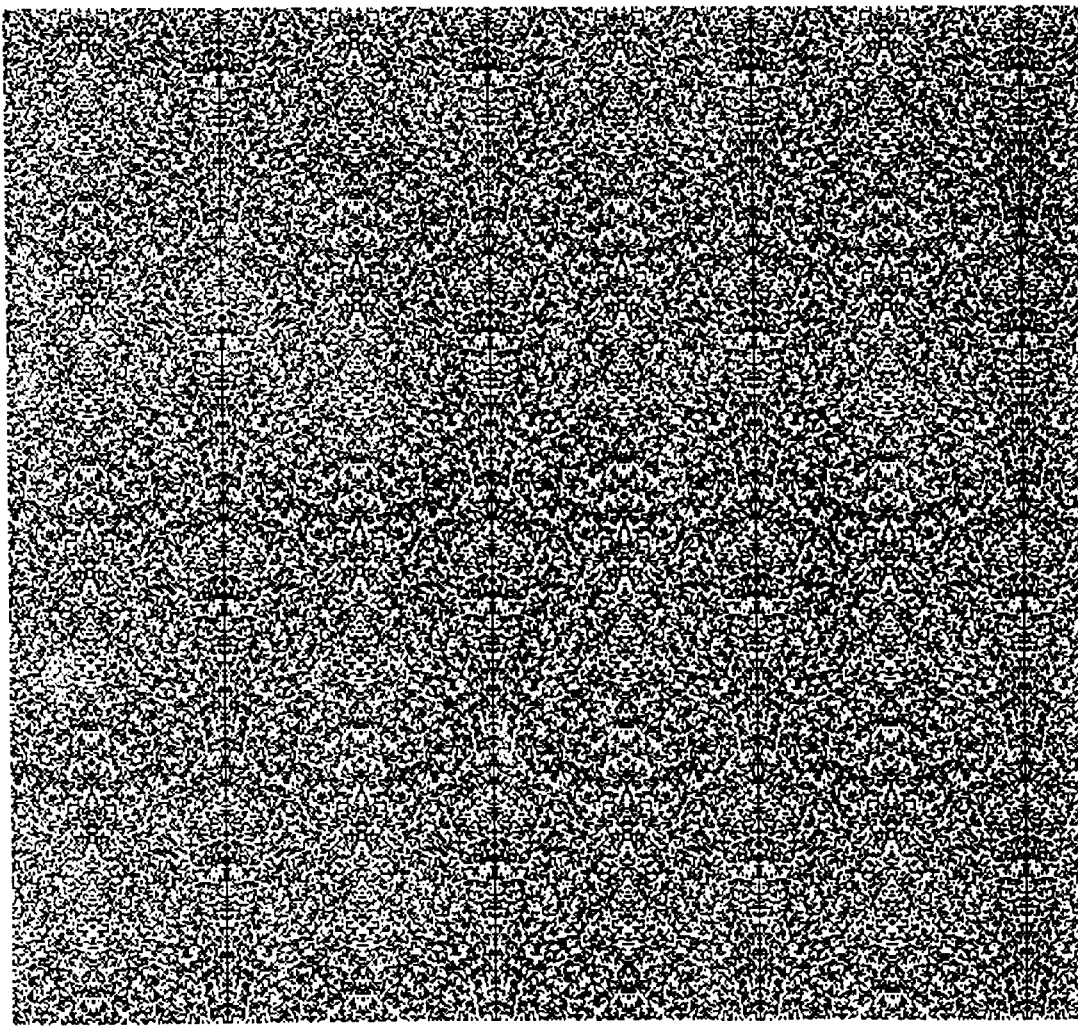
FIG. 2 shows a watermark pattern to illustrate the operation of the system shown in FIG. 1.

FIG. 1 shows a prior art system comprising a watermark embedder 1 and a watermark detector 2. The watermark embedder receives an original information signal p and a watermark signal w. The information signal p is assumed to be a digitized image having 8-bit luminance pixel values p(n). The watermark w is assumed to be a specific binary pattern of values w(n)=1 or w(n)=1. An example of such a watermark pattern is shown in FIG. 2. The watermark embedder comprises an adding stage 10 which adds the watermark values w(n) to the spatially corresponding pixels p(n) of the input image. It will be appreciated that this does not affect the visual appearance of the image. The embedded watermark is thus perceptually invisible.

The information signal q is applied, after transmission or storage (not shown), to the watermark detector 2. The watermark detector comprises a multiplication stage 21 and a summing circuit 22 which jointly constitute a correlation circuit. The multiplication stage receives the information signal q and a reference copy of the watermark w, the presence of which in the signal q is to be detected. The pixel values q(n) of the received image and the corresponding values w(n) of the reference watermark are individually multiplied and then summed up to obtain a decision variable y which represents the amount of correlation between input signal q and watermark w. In mathematical notation:

$$y = \sum_{n=1}^{N} w(n) \times q(n)$$

in which N is the total number of pixels.

Figure 3:
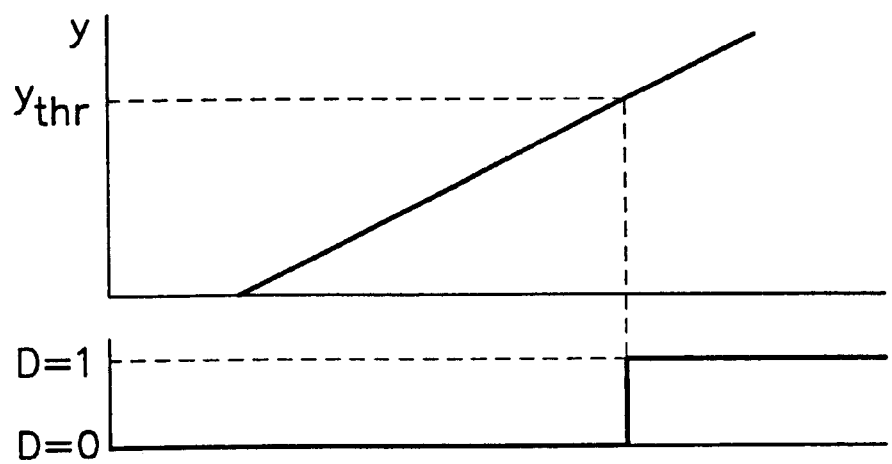
FIG. 3 shows waveforms illustrating the operation of the prior art watermark detector shown in FIG. 1.

The correlation value y is applied to a comparator 23 for comparison with a threshold value $y_{thr}$. As is shown in FIG. 3, the comparator produces an output D=1 (watermark found) for $y>y_{thr}$ and an output D=0 (no watermark found) for $y<y_{thr}$. The watermark pattern w and the threshold value $y_{thr}$ are carefully chosen in order to prevent the detector from making a false decision too frequently.

Figure 4:
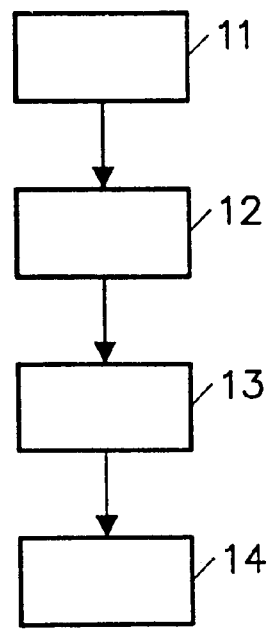
FIG. 4 shows a flowchart of operations for removing a watermark from a watermarked image using the prior art watermark detector which is shown in FIG. 1.

A method of removing the watermark from a watermarked image using the above described prior art watermark detector will now be described with reference to a flowchart of operations which is shown in FIG. 4. The attack applies to any watermark detector having a sharp transition between the decisions "watermark found" and "no watermark found".

In a first step 11, a test image is created which is near the boundary of the watermark to be removed. At this point it does not matter whether the resulting image resembles the original or not. The only criterion is that minor modifications of the test image cause the detector to respond with "watermark found" or "no watermark found" with a probability that is sufficiently different from zero or one. The test image can be created by tampering with a watermarked image (for which $y>>y_{thr}$) step-by-step until the detector responds with "no watermark found". One method is to gradually reduce the contrast in the image just enough to drop below the threshold where the detector reports the presence of the watermark. An alternative method is to replace more and more pixels in the image by neutral grey. There must be a point where the detector makes the transition from seeing a watermark to responding that the image is free of a watermark. Otherwise this step would eventually result in an evenly grey colored image, and no reasonable watermark detector can claim that such an image contains a watermark.

Having thus found a suitable test image, a portion of the image is modified in a step 12, e.g. a particular pixel value is increased or decreased, until the detector detects the watermark again. This provides insight into how the watermark embedder modifies the value of that pixel. Step 12 is repeated for every pixel in the image. It should be noted that instead of experimenting pixel by pixel, the attacker may also use another set of orthogonal modifications of the image, e.g. increasing or decreasing the DCT coefficients of a discrete cosine transform coded image.

Knowing how sensitive the detector is to modification of each pixel, a combination of pixel values which has the largest influence on the detector is estimated in a step 13. Then, in a step 14, the estimate is subtracted from the original marked image. It may be necessary to subtract the estimate $\lambda$ times to cause the detector to report that no watermark is present. $\lambda$ is found experimentally, and is preferably as small as possible.

The above described process results in a new image which is not recognized as being watermarked but only contains a minor distortion compared to the watermarked image or compared to the original unmarked image. This attack works equally well if the watermark is embedded in the DCT domain. The process can be repeated if the watermarking algorithm is suspected to contain non-linear, or image-dependent elements. Known simulation and search techniques, including simulated annealing can be exploited in this iterative process.

Figure 5:
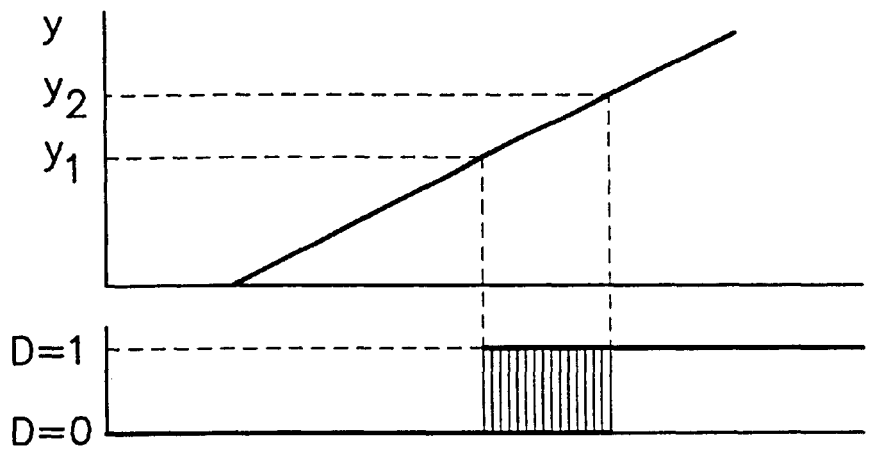
FIG. 5 shows waveforms illustrating the operation of the watermark detector in accordance with the invention.

The watermark detector in accordance with the invention is substantially less vulnerable to this attack. As is illustrated in FIG. 5, the detector randomizes the transition point from D=0 (no watermark found) to D=1 (watermark found) if the decision variable y has a value in a given interval $y_1<y<y_2$. Slightly modifying the applied signal while the detector operates in this interval (step 12 in FIG. 4) now does not give reliable feedback to an attacker. Accordingly, the watermark can no longer be estimated. The detector is less vulnerable to attacks as the distance between the threshold levels $y_1$ and $y_2$ is larger.

Figure 6:
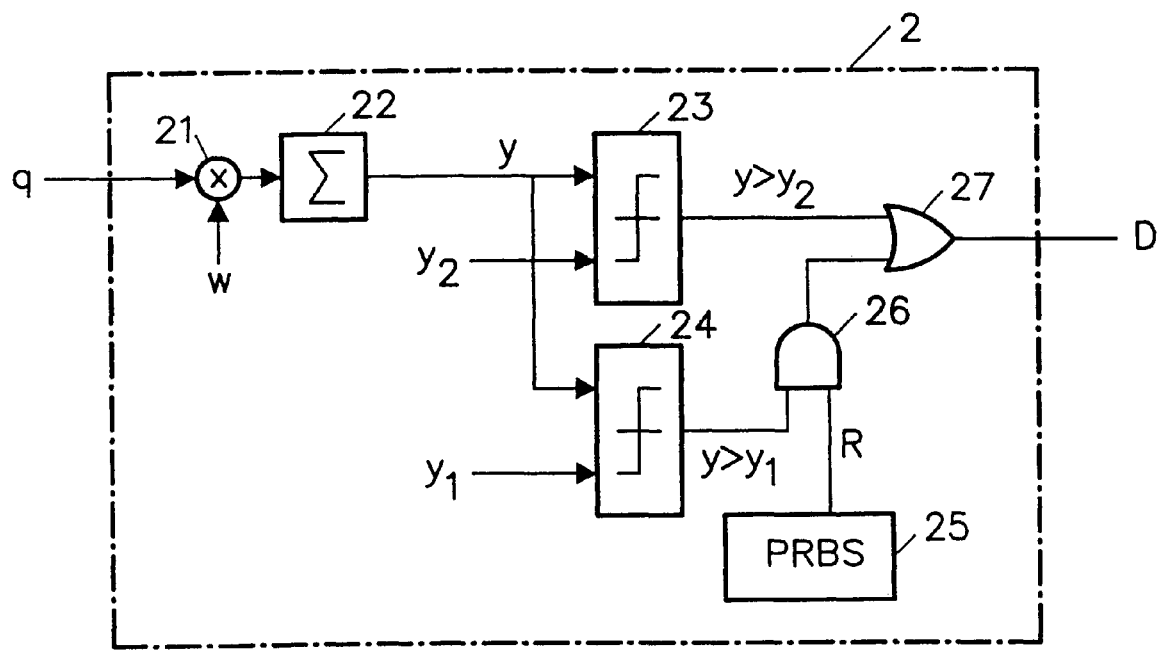
FIGS. 6–8 show embodiments of watermark detectors in accordance with the invention.

Embodiments of a watermark detector having the desired property can easily be designed by those skilled in the art. A straightforward example is shown in FIG. 6. In this example, the multiplication stage 21, summing circuit 22 and comparator 23 are the same as shown in FIG. 1. The detector comprises a further comparator 24 which compares the amount of correlation y with the lower threshold value $y_1$, and a pseudo-random binary sequence (PRBS) generator 25 which generates a random value R (0 or 1). A logic circuit comprising an AND-gate 26 and an OR-gate 27 combines both comparator outputs and the random value R to obtain the decision output signal D in accordance with the following truth table:

| $y > y_1$ | $y > y_2$ | D |
|---|---|---|
| 0 | 0 | 0 |
| 1 | 0 | R |
| 1 | 1 | 1 |

With the embodiment shown in FIG. 6, the interval end point $y=y_2$ where the detector switches from producing D=1 to producing D=R can be relatively easily found by an attacker. As the probability of producing D=0 in the interval is 50%, the first occurrence of D=0 while gradually affecting a watermarked image (step 11 in FIG. 4) is a reasonable indication of having found said end point. To alleviate this problem, a further embodiment of the watermark detector is arranged to produce the output signal D in the interval $y_1<y<y_2$ with a (preferably smoothly) increasing probability as y becomes closer to the threshold $y_2$.

Figure 7:
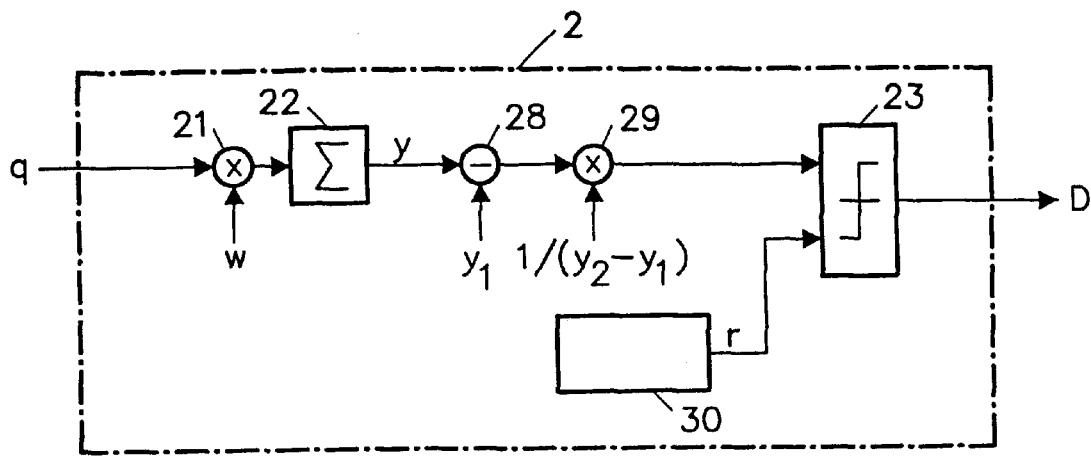

An embodiment of a watermark detector having such an increasing probability function is shown in FIG. 7. The detector comprises an arithmetic circuit composed of a subtracter 28 and a multiplier 29 which modifies the decision variable y into a signal z in accordance with:

$$z = \frac{y - y_1}{y_2 - y_1}$$

The signal z is applied to the comparator 23 which receives a random number r having a value of between 0 and 1 which is generated by a random number generator 30. As can easily be understood, the detector works exactly as the detector shown in FIG. 6 for images having a correlation $y>y_2$ and $y<y_1$. However, if the amount of correlation is between $y_1$ and $y_2$ (i.e. 0<z<1), the comparator output signal D depends on the actual value of r, while the probability of producing D=1 increases linearly in accordance with:

$$Pr(D = 1 \mid y) = \frac{y - y_1}{y_2 - y_1}$$

Figure 8:
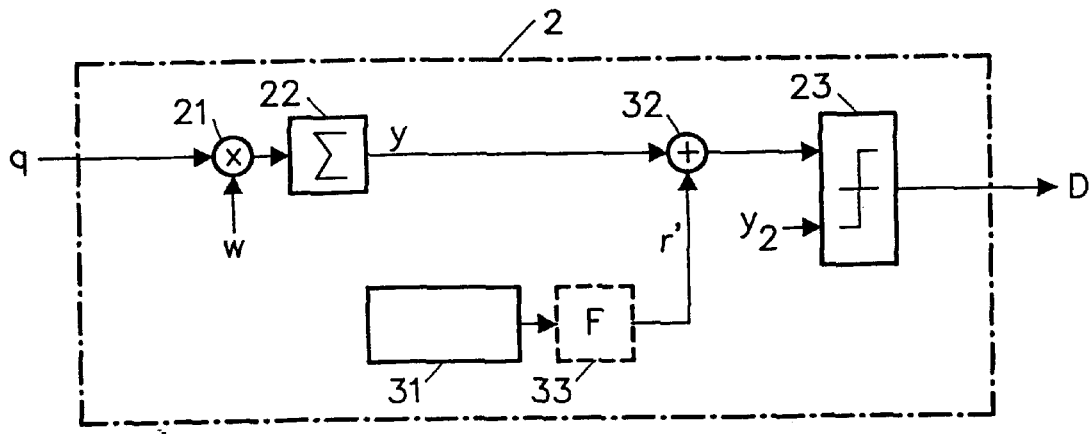
Figure 9:
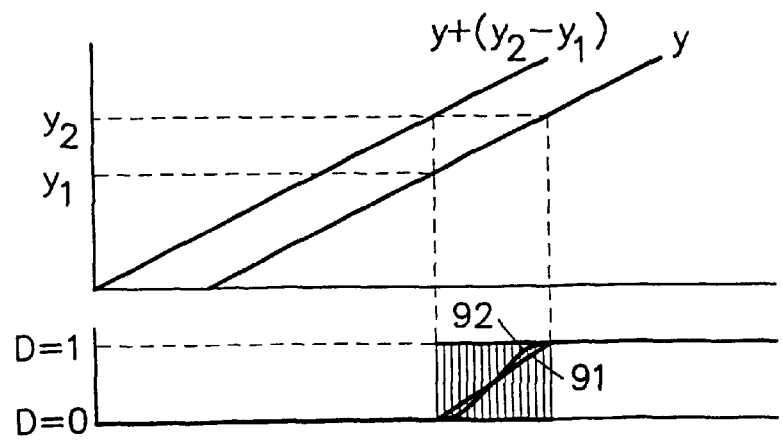
FIG. 9 shows waveforms illustrating the operation of the watermark detectors shown in FIGS. 7 and 8.

FIG. 8 shows another embodiment of the watermark detector in accordance with the invention. In this embodiment, a random number r' between 0 and $y_2-y_1$ is generated by a random number generator 31 and added to the decision value y by means of an adder 32. The signal y+r' is then compared with the threshold value $y_2$. As has been attempted to illustrate in FIG. 9, the comparator always produces an output D=0 for $y<y_1$ and an output D=1 for $y>y_2$, whereas it randomly produces 0 or 1 for $y_1<y<y_2$. Note that the probability of y+r' being larger than $y_2$ (resulting in D=1) is very small for values of y just above $y_1$, and very large for values of y just below $y_2$. Consequently, this embodiment inherently has the property of showing a linearly increasing probability of producing D=1 as y becomes larger. The linear probability curve is denoted 91 in FIG. 9.

The inventors have found that the best shape of the probability function in the interval $y_1<y<y_2$ is (or substantially resembles) a raised cosine function:

$$Pr(D=1|y) = \frac{1}{2} - \frac{1}{2}\cos\left(\pi\frac{y-y_1}{y_2-y_1}\right)$$

Such a probability curve (denoted 92 in FIG. 9) can be obtained by applying an appropriate mathematical function F to the output of random number generator 31. In FIG. 8, this function is performed by a conversion circuit 33 between the random number generator 31 and the adder 32.

Figure 10:
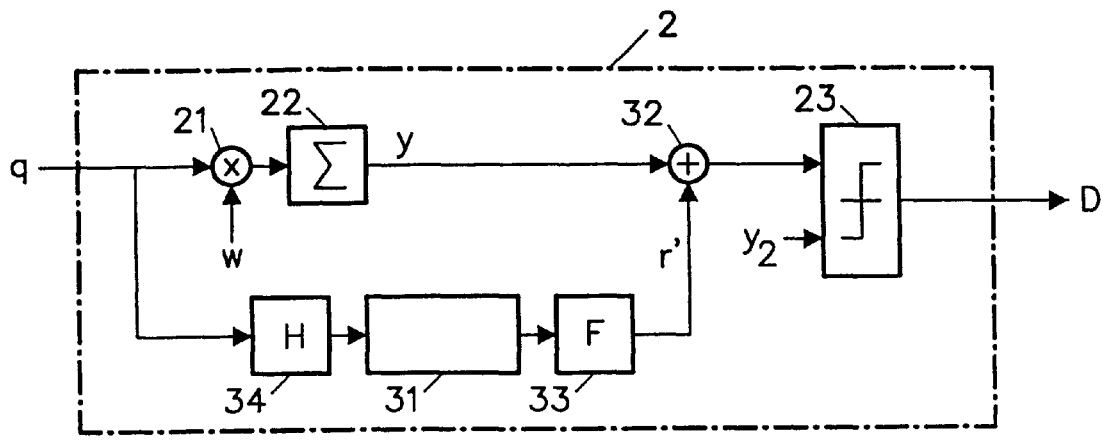
FIGS. 10–12 show further embodiments of watermark detectors in accordance with the invention.
Figure 11:
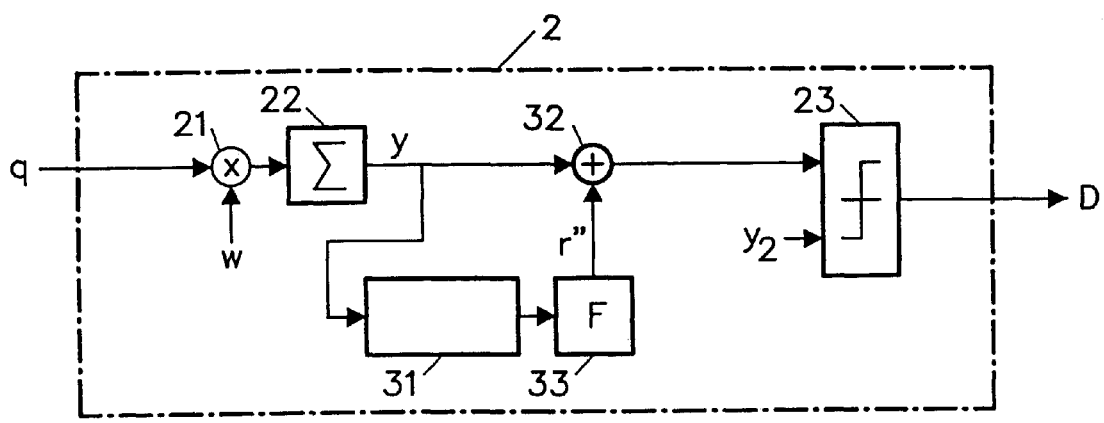

Repeatedly applying the same input image to any one of the above described embodiments of the watermark detector, and thereby counting the number of times the detector produces D=0 or D=1, teaches an attacker on which point of the probability curve the detector operates. FIGS. 10 and 11 show further improved watermark detectors which do not suffer from this drawback. In these embodiments, the random generator is of a type having a seed input. The generator produces the same random number whenever it receives the same seed. The seed input is derived from the input image so that the watermark detector produces the same output signal D whenever the same input image is applied. As a result thereof, an attacker cannot obtain statistical information about the operation point of the detector on the probability curve by repeatedly applying the same image.

In the embodiment shown in FIG. 10, the seed is derived from the input image by means of a circuit 34 which converts the received input image q into a number having fewer bits. The function of circuit 34 is usually referred to as "hash" function. The seed (for example, the modulo-N sum of all image pixel values) is then applied to the random generator 31. In the embodiment shown in Fig. 11, the correlation circuit (21,22) acts as the hash function. The decision value y itself is now applied to the seed input of the random number generator 31. It should be noted that the feature of applying a seed to the random generator can also be adopted for the embodiments shown in FIGS. 6 and 7.

The difference between a watermark detector with and without the seed feature can best be explained by way of an example. Applying the same input image 100 times to a watermark detector not having the seed feature will cause said detector to produce, for example, 90 times an output D=1 (watermark found) and 10 times an output D=0 (no watermark found). Applying the same input image 100 times to a watermark detector with the seed feature will cause the detector to produce 100 times the same output, the probability of D=1 being 90% and the probability of D=0 being 10%. In the latter case, an attacker cannot gather statistical information by repeating the watermark test for the same image over and over again.

Figure 12:
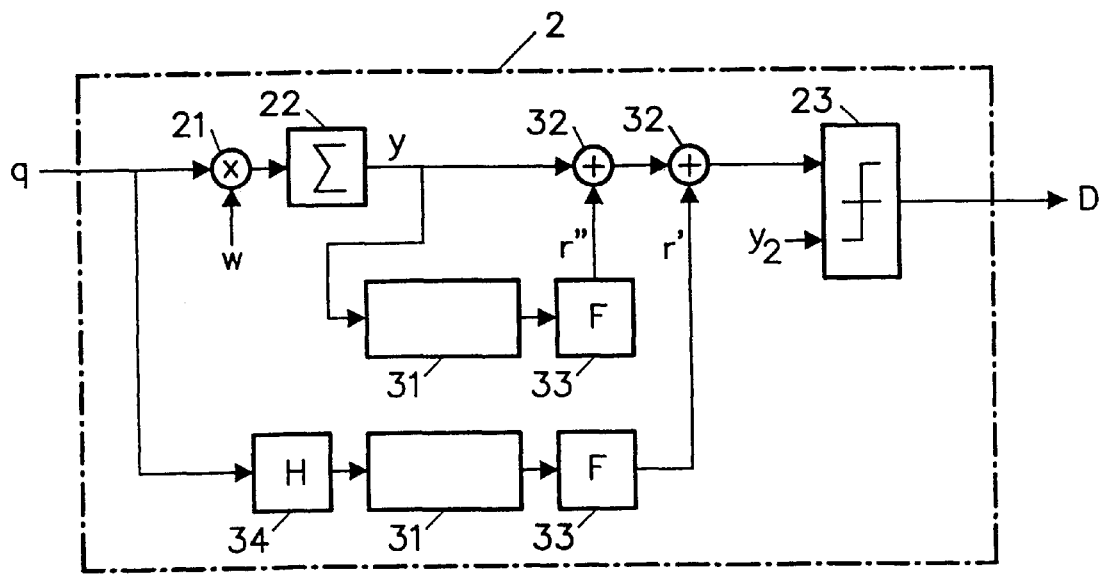

A watermark detector is particularly invulnerable to attacks if the above described features (smoothly increasing probability function, seed supply through the hash function and seed supply by the decision variable itself) are combined. Such an embodiment is shown in FIG. 12.

Randomization of the watermark detection point can also be obtained by randomly selecting the pixels considered for calculating the decision variable y (or, conversely, the pixels that are discarded). To this end, randomly selected image pixels q(n) and corresponding watermark values w(n) are applied to the correlation circuit 21,22 which is shown in FIG. 1. For example, if 60% of the pixels of a watermarked image are considered and the image is not modified by an attacker, the detector will still generate D=1 in spite of the decision value being less than when all pixels are considered. However, if pixels of the image are modified, the decision value can decrease which may result in D=0 being generated, dependent on how many pixels have been modified.

The invention can be summarized as follows. Recently developed methods for copy protection rely on a watermark detector to judge whether multimedia content can be copied or not. In such copy protection schemes, a watermark detector examines the multimedia content and outputs a signal (D) indicating whether a watermark is present or not. Known watermark detectors determine a decision variable (y) indicating to which extent the watermark is present, for example, the amount of correlation between the input signal and a reference copy of the watermark to be detected. The watermark is detected if the decision variable exceeds a predetermined threshold ($y_2$). Such a detector is vulnerable to an attack which is described in this patent application.

Disclosed is a watermark detector which increases the work load for an attacker by several orders of magnitude. To this end, the detector generates a random output signal for predetermined range of decision values (y) between the threshold ($y_2$) and a further threshold ($y_1$).

What is claimed is:

1. A method of detecting a watermark embedded in an information signal, comprising the steps of:
   determining a decision variable indicating to which extent the watermark is present in the signal; and
   generating an output signal indicating detection of the watermark if the decision variable exceeds a predetermined threshold ($y_2$); and randomly generating the output signal for decision values below the threshold ($y_2$).

2. The method as claimed in claim 1, further comprising the step of randomly generating the output signal for a range of decision values between the threshold ($y_2$) and a further predetermined threshold ($y_1$).

3. The method as claimed in claim 1, wherein the random output signal is generated with an increasing probability as the decision variable becomes closer to the predetermined threshold ($y_2$).

4. The method as claimed in claim 3, wherein the probability is a linear function of the decision variable within the range between the threshold ($y_2$) and the further threshold ($y_1$).

5. The method as claimed in claim 3, wherein the probability is a raised cosine function of the decision variable within the range between the threshold ($y_2$) and the further threshold ($y_1$).

6. The method as claimed in claim 1, wherein the step of randomly generating the output signal includes generating the same output signal whenever the same information signal is received.

7. An arrangement for detecting a watermark embedded in an information signal, comprising:

means for determining a decision variable indicating to which extent the watermark is present in the signal; and means for generating an output signal indicating detection of the watermark if the decision variable exceeds a predetermined threshold ($y_2$);

means for randomly generating the output signal for decision values below the threshold ($y_2$).

8. The arrangement as claimed in claim 7, in which the arrangement further comprises means for randomly generating the output signal for a range of decision values between the threshold ($y_2$) and a further predetermined threshold ($y_1$).

9. The arrangement as claimed in claim 7, further comprising means for generating the random output signal with an increasing probability as the decision variable becomes closer to the predetermined threshold ($y_2$).

10. The arrangement as claimed claim 9, wherein the means for randomly generating the output signal includes a random number generator with a seed input, and means for deriving the seed input from the information signal in accordance with a predetermined function.

11. The arrangement as claimed in claim 9, wherein the means for determining the decision variable constitute the means for deriving the seed input.

12. A multimedia playing and/or recording apparatus comprising:

means for reading an information signal from and/or writing an information signal to multimedia material storage;

means for determining a decision variable indicating to which extent the watermark is present in the signal; and means for generating an output signal indicating detection of the watermark if the decision variable exceeds a predetermined threshold;

means for randomly generating the output signal for decision values below the threshold ($y_2$).

13. The method of claim 1, in which:

the output signal is randomly generated for a range of decision values between the threshold ($y_2$) and a further predetermined threshold ($y_1$);

the random output signal is generated with an increasing probability as the decision variable becomes closer to the predetermined threshold ($y_2$);

the probability is a linear function of the decision variable within the range between the threshold ($y_2$) and the further threshold ($y_1$);

the probability is a raised cosine function of the decision variable within the range between the threshold ($y_2$) and the further threshold ($y_1$); and the step of randomly generating the output signal includes generating the same output signal whenever the same information signal is received.

14. The arrangement of claim 7, in which:

the arrangement further comprises means for randomly generating the output signal for a range of decision values between the threshold ($y_2$) and a further predetermined threshold ($y_1$);

means for generating the random output signal with an increasing probability as the decision variable becomes closer to the predetermined threshold ($y_2$);

the means for randomly generating the output signal includes a random number generator with a seed input, and means for deriving the seed input from the information signal in accordance with a predetermined function; and the means for determining the decision variable constitute the means for deriving the seed input.

* * * * *